Figure 1:
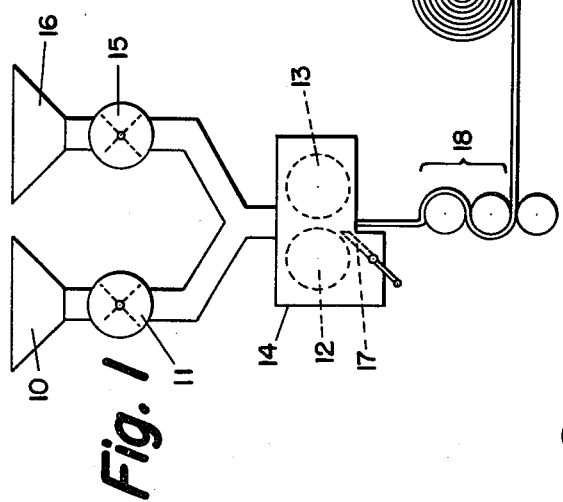

Nov. 7, 1961

J. C. DUDDY 3,007,991

FOAMED-SILVER ELECTRODE AND METHODS OF MAKING THE SAME

Filed June 25, 1958

United States Patent Office 3,007,991
Patented Nov. 7, 1961

3,007,991
FOAMED-SILVER ELECTRODE AND METHODS
OF MAKING THE SAME
Joseph C. Duddy, Trevose, Pa., assignor to The Electric Storage Battery Company, a corporation of New Jersey
Filed June 25, 1958, Ser. No. 744,543
7 Claims. (Cl. 136—20)

This invention relates to methods of producing porous silver structures suitable for use in batteries and for catalytic purposes and to the porous structures themselves.

This invention is a continuation-in-part of my application Serial No. 243,933, filed August 28, 1951, now Patent No. 2,881,237, for "Storage Battery Plate and Production Therof." In my said application I disclosed methods of making electrodes or battery plates consisting of cohering finely divided silver forming a spongy porous mass and of a character produced as the end product from the slow burning of a combustible carrier loaded or saturated with a compound of silver which is reduced during combustion of the carrier. More particularly, I disclosed in that application that the carrier or combustible material could be selected from the group consisting of filter paper, synthetic resins, and cloth. The material from the foregoing group had dispersed therethrough a compound of silver reducible upon combustion of the material to form a spongy mass of coherent finely divided silver. In my aforesaid application I proposed the use of silver nitrate as a silver compound suitable to the foregoing purposees and which upon combustion of the material with maximum temperatures well below the melting point of silver produced an electrode of great porosity, high efficiency, and highly useful as a battery electrode.

In my companion application Serial No. 744,542, filed June 25, 1958, I have disclosed and claimed electrodes and methods of producing them characterized by the intimate mixing of finely divided metals and metal oxides with certain thermoplastic materials, followed by controlled burning or oxidation of the thermoplastic material for the production of electrode material having a high degree of uniformity of distribution of the active ingredient, controlled uniform porosity and a low electrical resistance.

In accordance with the present invention, a thermoplastic material, preferably polyethylene, is worked under heat and pressure to produce a plasticized mass. There is intimately mixed into the mass finely divided silver oxide in proportion ranging from about two parts by weight of silver oxide to one part by weight of polyethylene, to about four parts by weight of silver oxide to one part by weight of polyethylene. The mixture is then calendered to produce a sheet of predetermined thickness. The sheet, either before or after being cut into the desired shape of the battery electrode, is subjected to an elevated temperature for the burning therefrom of the polyethylene. Due to the aforesaid ratio, there will be control of the temperature during combustion or oxidation of the polyethylene with resultant reduction of the silver oxide to silver powder of equivalent particle size.

The present invention is characterized by the release, during the controlled combustion, of the oxygen from the silver oxide. The released oxygen acts as, and/or generates a blowing or foaming agent and produces foamed silver, i.e., a porous mass characterized by extremely high porosity and yet structurized to a point where it may be handled, if due care be exercised. The foamed silver, because of its extremely high porosity and high effective surface area, has usefulness as a catalytic agent and the like. It is particularly applicable to the construction of battery electrodes as by the inclusion of a suitable grid. This may be achieved by pressing a grid therein, in which case the additional pressing not only produces intimate electrical connection with the grid for flow of current to and from the battery electrode, but it also increases the strength of the finely divided sliver forming the electrode, resulting in an electrode characterized by a somewhat lower porosity and relatively high strength. Electrodes may be made which are extremely thin even after the inclusion of the grid.

For a more detailed explanation of how to produce battery electrodes in accordance with the present invention, reference is to be had to the following description, taken in conjunction with the accompanying drawing, in which:

FIG. 1 schematically illustrates the mixing and sheeting operations; and

Figure 2:
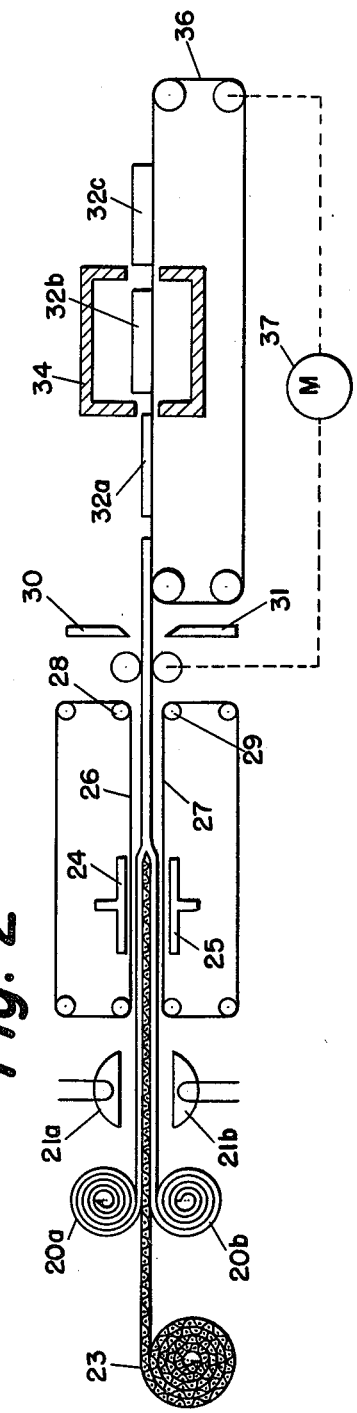

FIG. 2 schematically illustrates the electrode assembly and conversion operations.

Referring to FIG. 1, a thermoplastic resin, such as polyethylene, in powdered form flows from a supply bin 10 by way of a valve 11 to a mixing device 14 at elevated temperature, such for example, as a Banbury mixer, or as shown, two rolls operated at different speeds for plasticizing the polyethylene. The rolls 12 and 13 may be heated in any suitable manner as by steam, and preferably to a temperature of about 250° F.

After the plasticization has been completed, there is supplied to the mixing device 14, as by way of a valve 15 from a supply bin 16, finely divided silver oxide. The valves 11 and 15 are preferably in the form of metering devices so that for one part by weight of polyethylene there will be added to the mixture a selected amount of silver oxide within the range of about two parts to four parts of the polyethylene. After a time interval adequate for thorough and intimate mixing of the silver oxide into the polyethylene a stripper blade 17 is moved toward one of the rollers for progressive withdrawal therefrom of the banded mass of intimately mixed material. Thus it will be seen that the initial operation is essentially of the batch type. Those skilled in the art will understand how to select the time required for plasticizing a thermoplastic resin and also the time required to produce the intimate mixing described above. For example, the plasticizing time for polyethylene may be of the order of two or three minutes, and the mixing operation of the order of eight to ten minutes.

The mixture of metal oxide and the polyethylene removed from the mixer 14 is fed to a sheeting device 18 shown as a series of calendering rolls operated at elevated temperature, as for example, about 230° F. or lower. The calendering rolls may be set to produce a sheet of any desired thickness, for example, as thin as two or three mils. The temperatures set forth above have been found particularly suitable for that type of polyethylene available on the market under the designation of "Alathon 14." With other types of polyethylene, somewhat different temperatures may be found preferable, the plasticizing temperatures and the like, by information readily available from manufacturers of such different types of polyethylene powder.

If desired, the process from the calendering rolls on may be continuous, though in FIG. 1 the sheet material is wound upon itself or preferably upon a mandrel or core preparatory to the next operation. The sheet material illustrated as comprising the roll 20 may itself be pressed into a battery grid, preferably of silver, either of the screen or the expanded metal type or of other configuration, and utilized as a battery electrode. Preferably, however, two rolls of the sheet material, such as 20a and 20b, FIG. 2, form a supply of sheet material for the production of battery electrodes which include a grid. The sheet material from the rolls 20a and 20b is elevated in temperature by heating means shown as heating lamps 21a and 21b to, say, between 235° F. and 250° F. to soften the same. The operation may be continuous or intermittent. When intermittent, the grid 22 supplied from a supply roll 23, together with the sheet material, moves step-wise by predetermined amounts. With each movement, a pair of platens 24 and 25 are moved toward each other to press between them the softened sheet material and to press that material into the grid structure. The meeting surfaces of the sheets 20a and 20b band together within the interstices of the grid. A pressure of the order of 300 pounds per square inch will be adequate for this purpose.

Preferably, the faces of the platens will be coated with a material to which the polyethylene will not adhere. It has been found that sheets of cellophane 26 and 27 will prevent the sticking of the polyethylene to the platens. The cellophane sheets 26 and 27 may be in the form of endless belts which are of such lengths beyond the platens that the assembly has time to cool to aid in the removal of the sheets of cellophane as by the rollers 28 and 29. While the rolls for the cellophane sheets 26 and 27 may be separately driven by any suitable manner as by an electric motor, not shown, the composite sheet comprising the strips 20a and 20b and the grid 23 may be intermittently driven in a forward direction by a motor 37, also utilized to drive a conveyor for transporting the individual electrodes 32a—32c into and out of the enclosure 34.

It is to be understood that one sheet of the mixture may be pressed into a grid as explained above. It is to be further understood that two grids may be utilized with three or more sheets of the mixture. When more than one sheet of the mixture is utilized, they will be pressed into and through the grid so that in their softened state they will be bonded together. This forms an integral mass extending through and on opposite sides of the grid.

Through the assembly may be subjected to burning in continuous sheet form, it is preferred first to cut the sheet material into the shape of the battery electrode. This may be done by a severing device, such as illustrated by the blades 30 and 31. A pattern-forming die may be similarly utilized. With such a blanking die, electrodes of any shape may be thus produced.

Each electrode, such as the electrode 32a, is then moved into an enclosure 34 for the burning of the polyethylene. An electrode or plate 32b has been illustrated as supported on an open-mesh screen within the enclosure. It will be noted that the plates 32b and 32c have approximately twice the thickness of the electrode 32a which has not yet reached the enclosure.

When a battery electrode is first moved into enclosure 34, the electrode will be at room temperature. Its temperature is raised until ignition takes place. This may be accomplished by having a heating coil within the enclosure 34, but preferably there will be applied to an edge of each plate or electrode, as the plate 32b an igniting means which may be either a flame or a wire heated to the requisite temperature. As combustion progresses, the temperature rises. The polyethylene is softened. As the temperature rises, it appears that the first chemical reaction is the reduction of the silver oxide with release of oxygen therefrom. This takes place with the resin softened and plasticized, and because the release of the oxygen results from a progressive reaction, there is generated throughout the plasticized mass gaseous oxygen. This gaseous oxygen and gaseous products of combustion produces uniformly throughout the softened plasticized mass a blowing or foaming action. There is thus produced foamed silver. During the blowing, the porosity is greatly increased in manner characterizing foamed materials. Yet the result of the blowing action of the gaseous oxygen and the concurrently occurring burning of the polyethylene results in an end product consisting wholly of foamed silver and characterized by the absence of both the resin and the foaming agent. Since the oxygen released will be available to increase the effect of increasing the rate of combustion of the polyethylene, it is important that there be utilized polyethylene in proportions not substantially exceeding by weight about one-half of the silver oxide and not less than one-fourth of the silver oxide. A ratio of one part of the plasticized resin to three parts of silver oxide ($Ag_2O$) has been found highly satisfactory for the production of foamed silver electrodes.

It has been found that if the polyethylene be present in amount appreciably less than about one-fourth by weight, of the silver oxide ($Ag_2O$), there will be a resulting violent exothermic reaction which will tend to produce globules of silver, because of the rise in the temperature of the mass to within the melting temperature range of silver. The temperature of the mass is to be maintained below the silver melting temperature to avoid destruction of the foam characteristics which provide the high surface area and porosity desired in the end product. If the polyethylene be present in amount appreciably greater than one-half by weight of the silver oxide, there will not be attained the foam characteristics desired in the end product.

In this connection, it is to be noted that the polyethylene performs several functions. First, it provides a carrier in which a given volume of silver oxide may be dispersed uniformly. Secondly, it provides a carrier by means of which sheets of extraordinary thinness may be produced, making possible the production therefrom of shapes of any configuration. Third, it provides a substantially viscous or softened elastic medium in which the release of gas, the oxygen, produces the foam-like structure which characterizes the product after the ignition step. Finally, it represents a medium which after oxidation is lacking in a residue, and certainly any residue which is deleterious to the usefulness of the electrode in any battery application. As already mentioned, the polyethylene, being combustible and therefore a source of fuel for operation of the redox system of polyethylene and oxygen, also functions as a temperature moderator when present in the specified quantities relative to that of the silver oxide.

It is to be understood that the grid forms a multi-walled structure which confines the mixtures of polyethylene and silver oxide in the sense that it prevents expansion thereof along the length and breadth of each grid. The blowing or foaming agent consisting of the oxygen gas released from the silver oxide during reduction thereof and of other volatiles resulting from the thermal degradation of the resin is effective to cause expansion of the mixture to increase the thickness of the plate. In this connection, it is to be understood that electrodes of circular and of irregular shapes may be made by providing walls of the desired configuration into which there may be inserted electrodes prior to elevation of their temperature as described in conjunction with the furnace 34. Such electrodes may or may not include grids. The walls of the container will confine the mixture and provide an end-product of desired shape. It is to be further understood that my invention is applicable to the production of blown or foamed silver of relatively large volume, i.e., in length and breadth and thickness. For such applications, a quantity of the mixture of polyethylene and silver oxide will be placed within a closed container, but suitably vented, and the foregoing methods followed to convert the mixture into a final mass of structurized finely divided silver of impalpable fineness.

While the electrode 32b, after the polyethylene has been oxidized or burned away, has been described as "foamed silver," it is desirable to point out additional characteristics. In the absence of the grid 22, the foamed silver mass has some structural strength and may, with care, be removed from the furnace and utilized as an end product, as for catalytic applications. The silver particles are lightly coherent one to the other. The foamed silver mass is further characterized by the fineness, that is to say, that if a small section of the foamed silver be removed from the electrode and crumbled between thumb and finger, there will be lacking any feeling of particle size. The extremely high degree of fineness of the silver results in a corresponding increase in surface area available for chemical or electrochemical reactions and, particularly, for the realization of near theoretical efficiencies in electrochemical applications, such as battery electrodes. Because of the exceedingly great porosity in the foamed mass at the completion of the oxidizing operation, electrodes of increased strength and yet with porosity of a high order may be readily attained by subjecting the oxidized electrodes to a mild pressing operation. For example, each electrode may be placed between platens and a pressure of about 300 pounds per square inch applied. The porosity will be maintained relatively high and adequate for high rate discharges in battery applications after the pressing operation. The mild pressing action effectively reduces the interstitial void volume with a minimum change in the total interstitial surface area throughout the electrode.

While the present invention has been described as utilizing polyethylene, it is to be understood that other thermoplastic materials are also applicable. The present invention makes use of the properties of thermoplastic materials which enable them while in the plastic state to be loaded with solid fillers. To be suitable for the subject application, the thermoplastic substance must be capable of the required degree of loading by the silver oxide. It must be capable of removal by burning to leave a foamed mass of silver characterized by the high degree of fineness of the silver and extremely high porosity.

Some examples of suitable thermoplastic hydrocarbon materials or resins are polyethylene, polypropylene, and the lower homologues of these substances, the paraffin waxes, the polyethylene oxide resins, and polyethylene glycol.

What is claimed is:

1. The method of producing shapes of blown silver which comprises working under heat and pressure a mass of polyethylene to plasticize the same, mixing into said plasticized polyethylene finely divided silver oxide in the ratio by weight of about two parts of silver oxide to one part of said polyethylene and not exceeding about four parts of silver oxide to one part of polyethylene, calendering said mixture to produce a sheet, and elevating the temperature of at least a limited area of said sheet to initiate burning for evolution from said silver oxide of gaseous oxygen and simultaneously blowing said mixture by said released oxygen and by the volatile products of combustion of said polyethylene, said polyethylene being completely removed from the mixture by burning thereof.

2. The method of producing shapes of blown silver which comprises working under heat and pressure a mass of polyethylene to plasticize the same, mixing into said plasticized polyethylene finely divided silver in the ratio of about two parts by weight of silver oxide to one part by weight of said polyethylene and not exceeding about four parts of silver oxide to one part of polyethylene, calendering said mixture to produce a sheet, and elevating the temperature of said sheet to plasticize the mass and simultaneously to evolve from said silver oxide gaseous oxygen at a rate which produces blowing of the plasticized mixture, said temperature thereafter rising by an amount which produces rapid oxidation of the polyethylene for complete removal thereof from the mixture.

3. The method of producing shapes of blown silver which comprises working under heat and pressure a mass of polyethylene to plasticize the same, mixing into said plasticized polyethylene finely divided silver oxide in the ratio of about two parts by weight of silver oxide to one part by weight of said polyethylene and not exceeding about four parts of silver oxide to one part of polyethylene, calendering said mixture to produce a sheet, concurrently thermally decomposing said silver oxide and softening said polyethylene whereby the gaseous products of said decomposition produce blowing of said mixture by elevating the temperature of said sheet to the decomposition point of said silver oxide whereby gaseous oxygen is evolved and produces blowing of the mixture, said temperature being thereby further elevated for complete removal of the polyethylene from the mixture.

4. The method of producing a body which comprises uniformly mixing together a thermoplastic material which will burn at a temperature below the melting point of silver and silver oxide in the ratio by weight between about two parts to four parts of silver oxide to one part of thermoplastc material shaping said mixture, and igniting said shaped mixture to simultaneously evolve oxygen gas from the silver oxide within and throughout the mixture and to burn from the mass all of said thermoplastic material, said mass then consisting of impalpable silver particles of lightly coherent character.

5. The method of making battery electrodes which comprises working under heat and pressure a mass of polyethylene to plasticize the same, mixing into said plasticized polyethylene finely divided silver oxide in ratio of from about two parts to four parts by weight of the silver oxide to one part by weight of said polyethylene, calendering said mixture to produce a sheet, pressing a pair of softened sheets into a metallic grid, elevating the temperature of the grid assembly to ignite said polyethylene for evolution of oxygen gas from said silver oxide as a blowing agent uniformly dispersed through the softened polyethylene matrix, and to burn therefrom said polyethylene, the resultant mass being characterized by the presence of said grid and impalpable silver structurized therewith.

6. The method of making battery electrodes which comprises working under heat and pressure a mass of thermoplastic hydrocarbon material to plasticize the same, mixing into said plasticized thermoplastic material finely divided silver oxide in ratio of from about two parts to four parts by weight of the silver oxide to one part by weight of said thermoplastic material, calendering said mixture to produce a sheet, pressing a pair of softened sheets into a metallic grid, cutting said grid assembly into battery electrodes, elevating the temperature of the grid assembly to ignite the thermoplastic material for evolution of oxygen gas from said silver oxide as a blowing agent uniformly dispersed through the softened thermoplastic matrix and for consuming said thermoplastic material, and thereafter pressing said assembly, the resultant pressed porous mass being characterized by the presence of said grid and impalpable silver structurized therewith.

7. The method of making battery electrodes which comprises pressing into a grid assembly at least one softened sheet of polyethylene throughout which there is uniformly dispersed silver oxide in ratio by weight of two parts to four parts of silver oxide to one part of the polyethylene, cutting said grid assembly into the shape desired for the battery electrode, igniting said polyethylene for the removal of the same by burning and for the progressive evolution of oxygen gas from said silver oxide, said oxygen and volatile decomposition products of said polyethylene acting as a blowing agent uniformly dispersed through the softened polyethylene, and thereafter pressing said assembly, the resultant porous mass being characterized by the presence of said grid and structurized impalpable silver.

References Cited in the file of this patent

UNITED STATES PATENTS

| | | |
|---|---|---|
| 1,919,730 | Koenig et al. | July 25, 1933 |
| 2,122,053 | Burkhardt | June 28, 1938 |
| 2,359,970 | Clark | Oct. 10, 1944 |
| 2,681,375 | Vogt | June 15, 1954 |
| 2,709,651 | Gurnick et al. | May 31, 1955 |
| 2,792,302 | Mott | May 14, 1957 |
| 2,811,572 | Fischbach et al. | Oct. 29, 1957 |
| 2,818,462 | Solomon | Dec. 31, 1957 |
| 2,881,237 | Duddy | Apr. 7, 1959 |